(12) United States Patent
Lee et al.

(10) Patent No.: US 12,046,751 B2
(45) Date of Patent: Jul. 23, 2024

(54) LITHIUM SECONDARY BATTERY

(71) Applicant: LG Energy Solution, Ltd., Seoul (KR)

(72) Inventors: Jung Min Lee, Daejeon (KR); Young Min Lim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 554 days.

(21) Appl. No.: 17/431,865

(22) PCT Filed: Mar. 26, 2020

(86) PCT No.: PCT/KR2020/004112
§ 371 (c)(1),
(2) Date: Aug. 18, 2021

(87) PCT Pub. No.: WO2020/197278
PCT Pub. Date: Oct. 1, 2020

(65) Prior Publication Data
US 2022/0123297 A1    Apr. 21, 2022

(30) Foreign Application Priority Data

Mar. 28, 2019 (KR) .................. 10-2019-0036126

(51) Int. Cl.
| | | |
|---|---|---|
| *H01M 4/525* | (2010.01) |
| *H01M 4/02* | (2006.01) |
| *H01M 4/505* | (2010.01) |
| *H01M 4/583* | (2010.01) |
| *H01M 10/0525* | (2010.01) |
| *H01M 10/0567* | (2010.01) |
| *H01M 10/0569* | (2010.01) |

(52) U.S. Cl.
CPC ........... *H01M 4/525* (2013.01); *H01M 4/505* (2013.01); *H01M 4/583* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 2006/0228626 A1* | 10/2006 | Kawashima | ........ H01M 10/052 429/328 |
| 2010/0279168 A1 | 11/2010 | Lee et al. | |
| 2013/0071731 A1 | 3/2013 | Tokuda et al. | |
| 2013/0316229 A1 | 11/2013 | Sawa et al. | |
| 2014/0113202 A1 | 4/2014 | Sun et al. | |
| 2014/0154590 A1 | 6/2014 | Kramer et al. | |
| 2015/0017515 A1 | 1/2015 | Jeon et al. | |
| 2015/0044554 A1 | 2/2015 | Tokuda et al. | |
| 2015/0140446 A1 | 5/2015 | Li | |
| 2019/0267673 A1 | 8/2019 | Park et al. | |
| 2019/0356021 A1 | 11/2019 | Lim et al. | |

FOREIGN PATENT DOCUMENTS

| | | |
|---|---|---|
| CN | 101911370 A | 12/2010 |
| CN | 104247136 A | 12/2014 |
| CN | 105745780 A | 7/2016 |
| JP | 5573749 B2 | 8/2014 |
| JP | 2017152262 A | 8/2017 |
| KR | 20090074684 A | 7/2009 |
| KR | 20130069631 A | 6/2013 |
| KR | 20130118812 A | 10/2013 |
| KR | 101605935 B1 | 3/2016 |
| KR | 101702406 B1 | 2/2017 |
| KR | 20170061024 A | 6/2017 |
| KR | 20180000605 A | 1/2018 |
| KR | 20180010807 A | 1/2018 |
| KR | 20180023567 A | 3/2018 |
| KR | 20180106971 A | 10/2018 |
| WO | 2018169112 A1 | 9/2018 |

OTHER PUBLICATIONS

Li et al.' "Lithium malonatoborate additives enabled stable cycling of 5 V lithium metal and lithium ion batteries"; Nano Energy 40 (2017) pp. 9-19; available online Aug. 1, 2017 (Year: 2017).*

Extended European Search Report including Written Opinion for Application No. 20778718.5 dated Feb. 7, 2022, pp. 1-7.

Han JG, Lee JB, Cha A, Lee TK, Cho W, Chae S, Kang SJ, Kwak SK, Cho J, Hong SY, Choi NS. Unsymmetrical fluorinated malonatoborate as an amphoteric additive for high-energy-density lithium-ion batteries. Energy & Environmental Science. Apr. 6, 2018;11(6):1552-62.

(Continued)

*Primary Examiner* — Gregg Cantelmo

(74) *Attorney, Agent, or Firm* — Lerner David LLP

(57) ABSTRACT

A lithium secondary battery is disclosed herein. In some embodiments, a lithium secondary battery including a positive electrode including a lithium-nickel-cobalt-manganese-based oxide as a positive electrode active material, a negative electrode including a carbon-based negative electrode active material, a separator interposed between the negative electrode and the positive electrode, and a non-aqueous electrolyte solution containing a lithium salt, an organic solvent, and an additive. The organic solvent includes fluoroethylene carbonate in amount of 10 wt % or greater and ethylene carbonate in an amount of 20 wt % or less, based on the total weight of the organic solvent. The additive includes propene sultone and lithium fluoromalonato (difluoro) borate. The driving voltage of the lithium secondary battery is 4.35 V or greater.

13 Claims, No Drawings

(56) References Cited

OTHER PUBLICATIONS

International Search Report for PCT/KR2020/004112 mailed Jul. 8, 2020; 3 pages.

* cited by examiner

LITHIUM SECONDARY BATTERY

CROSS-REFERENCE TO RELATED APPLICATIONS

This application is a national phase entry under 35 U.S.C. § 371 of International Application No. PCT/KR2020/004112, filed on Mar. 26, 2020, which claims priority from Korean Patent Application No. 10-2019-0036126, filed on Mar. 28, 2019, the disclosures of which are incorporated by reference herein.

TECHNICAL FIELD

The present invention relates to a lithium secondary battery capable of suppressing the increase in electrode resistance and generation of gas when driven at a high voltage.

BACKGROUND ART

In recent years, interest in energy storage technology has increased, and as the application field of the technology expands to mobile phones, camcorders, notebook PCs, and furthermore, to electric vehicles, efforts into the research and development of electrochemical devices are becoming more and more concrete.

Among the electrochemical devices, interest in the development of chargeable/dischargeable secondary batteries is emerging. Particularly, lithium secondary batteries developed in the early 1990s have advantages of having a high driving voltage and significantly greater energy density, and thus, are attracting attention.

A lithium secondary battery is generally manufactured by interposing a separator between a positive electrode including a positive electrode active material made of a lithium-containing transition metal oxide and the like and a negative electrode including a carbonaceous negative electrode active material capable of occluding and releasing lithium ions, thereby providing an electrode assembly, inserting the electrode assembly into a battery case, injecting a non-aqueous electrolyte solution thereto, and then sealing the battery case.

Meanwhile, in recent years, a demand for high-capacity batteries has increased, and accordingly, research and development on lithium secondary batteries driven at high voltages (for example, 4.3 V or higher) which may increase battery capacity is actively conducted.

As a positive electrode active material of a lithium secondary battery, various lithium transition metal oxides such as $LiCoO_2$ and $LiNi_{1-a-b}Co_aMn_bO_2$ ($0<a<1$, $0<b<1$) are used.

Among the above, $LiCoO_2$ exhibits excellent cycle properties even at a relatively high voltage, and thus, is advantageous, but is low in charge/discharge residual amount, and thus, has poor capacity properties. In addition, due to a sharp increase in the price of cobalt, which is a raw material, the manufacturing cost is high.

Therefore, in recent years, the development of a battery using a lithium-nickel-cobalt-manganese-based oxide, such as $LiNi_{1-a-b}Co_aMn_bO_2$, as a positive electrode active material has been actively underway. However, in the case of a battery to which a lithium-nickel-cobalt-manganese-based oxide is applied, during high voltage driving, the battery performance is rapidly deteriorated due to the side reaction between a positive electrode and an electrolyte, and swelling occurs due to the generation of gas. Particularly, the degradation in high-temperature cycle properties and high-temperature storage capacity is severe.

Therefore, there has been a demand for a lithium secondary battery capable of implementing stable performance at a high voltage even when a lithium-nickel-cobalt-manganese-based oxide is applied thereto.

DISCLOSURE OF THE INVENTION

Technical Problem

An aspect of the present invention provides a lithium secondary battery having excellent high-temperature lifespan properties and high-temperature storage properties even when driven at a high voltage of 4.35 V or greater while using a lithium-nickel-cobalt-manganese-based oxide as a positive electrode active material.

Technical Solution

According to an aspect of the present invention, there is provided a lithium secondary battery including: a positive electrode including a lithium-nickel-cobalt-manganese-based oxide as a positive electrode active material; a negative electrode including a carbon-based negative electrode active material; a separator interposed between the negative electrode and the positive electrode; and a non-aqueous electrolyte solution containing a lithium salt, an organic solvent, and an additive. At this time, the organic solvent includes 10 wt % or greater of fluoroethylene carbonate and 20 wt % or less of ethylene carbonate, the additive includes propene sultone and lithium fluoromalonato (difluoro) borate, and the driving voltage of the lithium secondary battery is 4.35 V or greater.

Advantageous Effects

A lithium secondary battery according to the present invention exhibits excellent high-temperature cycle properties and excellent high-temperature storage properties when driven at a high voltage even when a lithium-nickel-cobalt-manganese-based oxide is used as a positive electrode active material, since a non-aqueous electrolyte solution uses an additive and an organic solvent of a specific combination.

Specifically, in the present invention, the content of ethylene carbonate, which is easily decomposed at a high voltage, is lowered in an organic solvent of a non-aqueous electrolyte solution, and fluoroethylene carbonate, which is relatively more stable, is included in 10 wt % or greater in excess. In addition, propene sultone and lithium fluoromalonato (difluoro) borate, which form an SEI film by reacting with a carbon-based negative electrode active material and a lithium-nickel-cobalt-manganese-based oxide respectively, are used as an additive of the non-aqueous electrolyte solution, so that gas generation, transition metal elution, and the like caused by the decomposition of an electrolyte solution and reaction between an active material and the electrolyte solution during high-voltage driving are minimized, thereby improving the deterioration in performance of the battery.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The present inventors have repeatedly conducted research to develop a lithium secondary battery which has stable battery performance at a high voltage of 4.35 V or higher even when using a lithium-nickel-cobalt-manganese-based oxide as a positive electrode active material, and a carbon-based negative electrode active material. As a result, the inventors have discovered that when an organic solvent and an additive of a non-aqueous electrolyte solution are used in a specific combination, the battery performance at a high voltage, the battery performance at high temperatures/high voltages in particular, is significantly improved, and have completed the present invention.

Specifically, a lithium secondary battery of the present invention is a lithium secondary battery having a driving voltage of 4.35 V or higher, preferably 4.35 V to 4.45 V, and includes a positive electrode including: a lithium-nickel-cobalt-manganese-based oxide as a positive electrode active material; a negative electrode including a carbon-based negative electrode active material; a separator interposed between the negative electrode and the positive electrode; and a non-aqueous electrolyte solution containing a lithium salt, an organic solvent, and an additive, wherein the organic solvent includes 10 wt % or greater of fluoroethylene carbonate and 20 wt % or less of ethylene carbonate, the additive includes propene sultone and lithium fluoromalonato (difluoro) borate.

Hereinafter, each component of the lithium secondary battery of the present invention will be described in detail.

Positive Electrode

A positive electrode according to the present invention includes a lithium-nickel-cobalt-manganese-based oxide as a positive electrode active material. Specifically, the positive electrode may include a positive electrode active material layer containing a lithium-nickel-cobalt-manganese-based oxide as a positive electrode active material, and if necessary, the positive electrode active material layer may further include a conductive material and/or a binder.

The lithium-nickel-cobalt-manganese-based oxide used as a positive electrode active material is a lithium composite transition metal oxide including nickel, cobalt, and manganese as transition metal elements. For example, the lithium-nickel-cobalt-manganese-based oxide may be represented by Formula 1 below.

$$\text{Li}_x[\text{Ni}_y\text{Co}_z\text{Mn}_w\text{M}^1_v]\text{O}_{2-p}\text{A}_p \quad \text{[Formula 1]}$$

In [Formula 1] above, the $M^1$ is a doping element substituted for a transition metal site, and may be one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

The A is an element substituted for an oxygen site, and may be one or more elements selected from the group consisting of F, Cl, Br, I, At, and S.

The x represents the atomic ratio of lithium in the lithium-nickel-cobalt-manganese-based oxide with respect to the total transition metals, and may be 1 to 1.30, preferably greater than 1 to less than or equal to 1.30, more preferably 1.005 to 1.30, and even more preferably 1.01 to 1.20.

The y represents the atomic ratio of nickel among the transition metals in the lithium-nickel-cobalt-manganese-based oxide, and may be 0.3 to less than 1, more preferably 0.5 to 0.95. As the content of nickel among the transition metals increases, a higher capacity may be implemented, so that it is more advantageous in implementing a high capacity when the nickel content is 0.5 or greater.

The z represents the atomic ratio of cobalt among the transition metals in the lithium-nickel-cobalt-manganese-based oxide, and may be greater than 0 to less than or equal to 0.6, preferably 0.01 to 0.4.

The w represents the atomic ratio of manganese among the transition metals in the lithium-nickel-cobalt-manganese-based oxide, and may be greater than 0 to less than or equal to 0.6, preferably 0.01 to 0.4.

The v represents the atomic ratio of the doping element $M^1$ doped on the transition metal site in the lithium-nickel-cobalt-manganese-based oxide, and may be 0 to 0.2, preferably 0 to 0.1. When the doping element $M^1$ is added, there is an effect of improving the structural stability of the lithium-nickel-cobalt-manganese-based oxide. However, when the content of doping elements increases, the capacity may decrease, so that it is preferable that the doping element $M^1$ is included in the content of 0.2 or less.

The p represents the atomic ratio of the element A substituted for the oxygen site, and may be 0 to 0.2, preferably 0 to 0.1.

Meanwhile, in Formula 1 above, $y+z+w+v=1$.

Specific examples of the lithium-nickel-cobalt-manganese-based oxide may be $\text{LiNi}_{1/3}\text{Co}_{1/3}\text{Mn}_{1/3}\text{O}_2$, $\text{LiNi}_{0.5}\text{Co}_{0.2}\text{Mn}_{0.4}\text{O}_2$, $\text{LiNi}_{0.5}\text{CO}_{0.3}\text{Mn}_{0.2}\text{O}_2$, $\text{LiNi}_{0.6}\text{CO}_{0.2}\text{Mn}_{0.2}\text{O}_2$, $\text{LiNi}_{0.8}\text{Co}_{0.1}\text{Mn}_{0.1}\text{O}_2$, and the like, but are not limited thereto.

The lithium-nickel-cobalt-manganese-based oxide may implement relatively stable performance at a driving voltage of 4.2 V or less. However, when the driving voltage is 4.3 V or higher, particularly 4.35 V or higher, side reactions with an electrolyte solution become severe, and transition metal ions are eluted to rapidly degrade battery performance, it is known that such performance degradation is further intensified when the temperature rises. Therefore, in a typical high-voltage battery, a lithium-cobalt-based oxide such as $\text{LiCoO}_2$ has been mainly used as a positive electrode active material. However, according to the research of the present inventors, as to be described later, when an organic solvent and an additive of a specific combination are used in an electrolyte solution, even when a lithium-nickel-cobalt-manganese-based oxide is applied as a positive electrode active material, battery performance may be stably implemented under high voltage/high temperature conditions.

The positive electrode active material may be included in an amount of 80 wt % to 98 wt %, more specifically 85 wt % to 98 wt % based on the total weight of the positive electrode active material layer. When the positive electrode active material is included in the above range, excellent capacity properties may be exhibited.

Next, the conductive material is used to impart conductivity to an electrode, and any conductive material may be used without particular limitation as long as it has electron conductivity without causing a chemical change in a battery to be constituted.

Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

The conductive material may be included in an amount of 0.1 wt % to 10 wt %, preferably 0.1 wt % to 5 wt % based on the total weight of the positive electrode active material layer.

Next, the binder serves to improve the bonding between positive electrode active material particles and the adhesion between a positive electrode active material and a current collector.

Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene butadiene rubber (SBR), fluorine rubber, or various copolymers thereof, and any one thereof or a mixture of two or more thereof may be used. The binder may be included in an amount of 0.1 wt % to 15 wt %, preferably 0.1 wt % to 10 wt % based on the total weight of the positive electrode active material layer.

The positive electrode of the present invention as described above may be manufactured by a method for manufacturing a positive electrode known in the art. For example, the positive electrode may be manufactured by preparing a positive electrode slurry by dissolving or dispersing a positive electrode active material, a binder and/or a conductive material in a solvent and applying the positive electrode slurry on a positive electrode current collector, followed by drying and roll-pressing, or by casting the positive electrode slurry on a separate support, and then laminating a film obtained by peeling off the support on a positive electrode current collector.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion force of a positive electrode material. For example, the positive electrode current collector may be used in various forms such as a film, a sheet, a foil, a net, a porous body, a foam, and a non-woven body.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent to be used is not particularly limited as long as it may be adjusted such that a positive electrode mixture material has an appropriate viscosity in consideration of the applying thickness, preparation yield, workability, and the like of the positive electrode mixture material.

Negative Electrode

Next, a negative electrode will be described.

The negative electrode according to the present invention includes a carbon-based negative electrode active material as a negative electrode active material. Specifically, the negative electrode includes a negative electrode active material layer containing a carbon-based negative electrode active material, and the negative electrode active material layer may further include, if necessary, a conductive material and/or a binder.

As the carbon-based negative electrode active material, various carbon-based negative electrode active materials used in the art may be used, for example, graphite-based materials such as natural graphite, artificial graphite, and Kish graphite; high-temperature sintered carbon such as pyrolytic carbon, mesophase pitch based carbon fiber, meso-carbon microbeads, Mesophase pitches, and petroleum or coal tar pitch derived cokes, soft carbon, hard carbon, and the like. The shape of the carbon-based negative electrode active material is not particularly limited. Materials of various shapes such as irregular, planar, flaky, spherical, or fibrous shapes may be used.

Preferably, the carbon-based negative electrode active material may include at least one or more of natural graphite and artificial graphite. More preferably, the carbon-based negative electrode active material may include natural graphite and artificial graphite. When natural graphite and artificial graphite are used together, the adhesion to a current collector is increased to prevent the de-intercalation of an active material.

Meanwhile, the negative electrode according to the present invention may further include different types of negative electrode active materials, such as a silicon-based negative electrode active material, in addition to the carbon-based negative electrode active material.

The silicon-based negative electrode active material may include one or more selected from the group consisting of Si, $SiO_x$ (wherein 0<x<2), a silicon carbide (SiC), and an Si—Y alloy (wherein, the Y is an element selected from the group consisting of an alkali metal, an alkaline earth metal, a Group 13 element, a Group 14 element, a transition metal, a rare earth element, and a combination thereof, but not Si). The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Since the silicon-based negative electrode active material exhibits higher capacity properties than the carbon-based negative electrode active material, when the silicon-based negative electrode active material is additionally included, more excellent capacity properties may be obtained.

According to one embodiment, the negative electrode active material may be a mixture of a silicon-based negative electrode active material and a carbon-based negative electrode active material, and at this time, the mixing ratio of the silicon-based negative electrode active material and the carbon-based negative electrode active material may be 1:99 to 50:50, preferably 5:95 to 30:70 in a weight ratio. When the mixing ratio of the silicon-based negative electrode active material and the carbon-based negative electrode active material satisfies the above range, the volume expansion of the silicon-based negative electrode active material is suppressed while the capacity properties are improved, so that it is possible to ensure excellent cycle performance.

The negative electrode active material may be included in an amount of 80 wt % to 99 wt % based on the total weight of the negative electrode active material layer. When the content of the negative electrode active material satisfies the above range, excellent capacity properties and electrochemical properties may be obtained.

Next, the conductive material is a component for further improving the conductivity of the negative electrode active material, and may be added in an amount of 10 wt % or less, specifically 5 wt % or less, based on the total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The binder is a component for assisting in bonding between a conductive material, an active material, and a current collector, and is typically added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The negative electrode may be manufactured by a method for manufacturing a negative electrode known in the art. For example, the negative electrode may be manufactured by preparing a negative electrode slurry by dissolving or dispersing a negative electrode active material and selectively a binder and a conductive material in a solvent and applying, roll-pressing, and then drying the negative electrode slurry on a negative electrode current collector, or by casting the negative electrode slurry on a separate support, and then laminating a film obtained by peeling off the support on a negative electrode current collector.

The negative electrode current collector is not particularly limited as long as it has high conductivity without causing a chemical change in a battery. For example, copper, stainless steel, aluminum, nickel, titanium, fired carbon, or copper or stainless steel that is surface-treated with one of carbon, nickel, titanium, silver, and the like, an aluminum-cadmium alloy may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent to be used is not particularly limited as long as it may be adjusted such that a negative electrode slurry has an appropriate viscosity in consideration of the applying thickness, preparation yield, workability, and the like of a negative electrode mixture material.

Non-Aqueous Electrolyte Solution

Next, a non-aqueous electrolyte solution will be described. The lithium secondary battery of the present invention includes a non-aqueous electrolyte solution containing an organic solvent, an additive, and a lithium salt.

At this time, the organic solvent includes ethylene carbonate and fluoroethylene carbonate, and the content of the ethylene carbonate is 20 wt % or less based on the total weight of the organic solvent, and the content of the fluoroethylene carbonate is 10 wt % or greater based on the total weight of the organic solvent.

Preferably, based on the total weight of the organic solvent, the content of the ethylene carbonate is 1 to 20 wt %, preferably 5 to 20 wt %, and more preferably 10 to 20 wt %. A typical non-aqueous electrolyte solution for a lithium secondary battery contains ethylene carbonate in 25 wt % or greater. However, when a non-aqueous electrolyte solution containing ethylene carbonate of 20 wt % or greater is used in a secondary battery to which a lithium-nickel-cobalt-manganese-based oxide is applied as a positive electrode active material, during a high voltage driving of 4.35 V or higher, ethylene carbonate is decomposed and reacts with the positive electrode active material to cause the generation of a large amount of gas and the elution of transition metals, so that the battery performance is rapidly degraded. Therefore, in the present invention, ethylene carbonate is contained in 20 wt % or less in an organic solvent to solve a problem caused by the decomposition of ethylene carbonate at a high voltage.

Meanwhile, the fluoroethylene carbonate may be included in an amount of 10 wt % or greater, preferably 10 wt % to 40 wt %, and more preferably 10 wt % to 30 wt % based on the total weight of the organic solvent. When the fluoroethylene carbonate is included in 10 wt % or greater as described above, the oxidation and reduction stability of the electrolyte may be increased.

By decreasing the content of ethylene carbonate and increasing the content of fluoroethylene carbonate as described above, it is possible to improve the oxidation stability, and thus, further suppress the generation of gas at a high voltage. In addition, as in the present invention, when fluoroethylene carbonate is used in 10 wt % or greater, LiF film components on positive electrode and negative electrode surfaces are increased, thereby helping to improve performance at a high voltage, and an SEI film is easily formed on the surface of a negative electrode to easily protect the negative electrode. Furthermore, lifespan performance at a high voltage may be improved.

Meanwhile, the organic solvent may further include a different organic solvent component in addition to ethylene carbonate and fluoroethylene carbonate. The different organic solvent component may be included in an amount of 30 wt % to 89 wt %, preferably 40 wt % to 80 wt %, and more preferably 50 wt % to 75 wt % based on the total weight of the organic solvent.

The different organic solvent component may be, for example, a linear carbonate solvent, an ester solvent, or a combination thereof.

The linear carbonate solvent may be one or a mixed solution of two or more selected from the group consisting of dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

In addition, the ester solvent may be one or a mixed solution of two or more selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone.

According to one embodiment, the organic solvent may include ethylene carbonate, fluoroethylene carbonate, and linear carbonate. More specifically, the organic solvent comprises 10 to 20 wt % of ethylene carbonate, 10 to 40 wt % of fluoroethylene carbonate, and 40 to 80 wt % of linear carbonate.

According to another embodiment, the organic solvent may include ethylene carbonate, fluoroethylene carbonate, and a propionate-based solvent. At this time, the propionate-based solvent may include, but is not limited thereto, ethyl propionate and propyl propionate.

Meanwhile, when ethyl propionate and propyl propionate are additionally included, the weight ratio of the propyl propionate to the ethyl propionate may be 1 or greater, preferably 1 to 7. When the weight ratio of the propyl propionate to the ethyl propionate satisfies the above range, it is possible to secure ionic mobility by improving ionic conductivity and reducing viscosity while maintaining the oxidation stability of the electrolyte solution.

For example, the organic solvent may include 10 to 20 wt % of fluoroethylene carbonate, 10 to 20 wt % of ethylene carbonate, 10 to 30 wt % of ethyl propionate, and 30 to 70 wt % of propyl propionate. When the composition of the organic solvent satisfies the above range, there is an effect of improving the ionic conductivity as well as having high oxidation stability.

Next, the non-aqueous electrolyte solution according to the present invention includes propene sultone and lithium fluoromalonato (difluoro) borate as an additive.

The lithium fluoromalonato (difluoro) borate is a material which mainly reacts with a lithium-nickel-cobalt-manganese-based oxide to form an SEI film on a positive electrode. The SEI film formed by the lithium fluoromalonato (difluoro) borate is stable without being decomposed even under a high temperature/high voltage condition, and thus, may effectively suppress transition metal elution and positive electrode performance deterioration under the high temperature/high voltage condition.

The propene sultone is a material which reacts with a carbon-based negative electrode active material to form a negative electrode SEI film. When the lithium fluoromalonato (difluoro) borate and the propene sultone are used together as an electrolyte solution additive, a stable SEI film is formed on a positive electrode and a negative electrode, and thus, even during a high voltage driving, the reaction between an electrolyte solution and an electrode is effectively prevented to effectively suppress gas generation, transition metal elution, and battery performance degradation.

The lithium fluoromalonato (difluoro) borate may be included in an amount of 0.1 to 3 wt %, preferably 0.5 to 1 wt %, based on the total weight of the non-aqueous electrolyte solution. When the content of lithium fluoromalonato (difluoro) borate satisfies the above range, an effect of lifespan improvement and gas reduction may be obtained through the formation of positive electrode and negative electrode films without additional resistance increase and side reactions.

The propene sultone may be included in an amount of 0.5 to 5 wt %, preferably 1 to 3 wt %, based on the total weight of the non-aqueous electrolyte solution. When the content of propene sultone satisfies the above range, an effect of high-temperature performance improvement and gas reduction may be obtained through the formation of appropriate positive electrode and negative electrode films while suppressing additional resistance increase.

Meanwhile, the non-aqueous electrolyte solution may further include other additives in addition to propene sultone and lithium fluoromalonato (difluoro) borate.

An additive which may be additionally included may be, for example, at least one compound selected from the group consisting of vinylene carbonate (VC), propane sultone (PS), polyphenylene sulfide, succinonitrile (SN), lithium difluoro (oxalato) borate (LiODFB), vinyl ethylene carbonate (VEC), ethylene sulfate (ESa), adiponitrile (ADN), lithium bis (oxalato) borate (LiBOB), lithium tetrafluoro borate (LiBF4), lithium difluoro phosphate (LiDFP), ethylene glycol bis (2-cyano ethyl) ether (ASA3), fluorobenzene (FB), and 1,3,6-hexanetricarbonitrile (HTCN).

When an additional additive is further included as described above, it is possible to form a more stable SEI film on the positive electrode and the negative electrode, and thus, it is possible to further improve battery durability and stability under a high voltage/high temperature condition.

The additive to be additionally included may be included in an amount of 20 wt % or less, preferably 0.1 to 15 wt %, and more preferably 0.5 to 10 wt % based on the total weight of the non-aqueous electrolyte solution. When the content of the additional additive satisfies the above range, while forming a protective film on both electrodes to prevent the performance of the battery from being degraded, it is possible to control the problem of resistance increase, or side reactions, which may occur as the additive remains after the reaction to form the film is terminated.

Next, any lithium salt may be used without particular limitation as long as it is typically used in an electrolyte solution for a lithium secondary battery. For example, the lithium salt may include Li+ as a positive ion, and include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as a negative ion. Specifically, the lithium salt may include a single material or a mixture of two or more selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$.

The content of the lithium salt may be appropriately changed within a typical range in which a lithium salt may be used. Specifically, the lithium salt may be included in an electrolyte in a range of 0.8 M to 3 M, specifically 0.1 M to 2.5 M.

Separator

The lithium secondary battery according to the present invention includes a separator between the positive electrode and the negative electrode.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable.

Specifically, as the separator, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

The above-described lithium secondary battery according to the present invention may have a driving voltage of 4.35 V or higher due to the excellent stability and electrochemical performance thereof, and when driven at such a high driving voltage, may implement excellent high capacity properties compared to a typical lithium secondary battery.

The lithium secondary battery according to the present invention as described above may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

EXAMPLES

Example 1

(Preparation of Non-Aqueous Electrolyte Solution)

In 98 g of a non-aqueous organic solvent in which ethylene carbonate (EC):fluoroethylene carbonate (FEC): diethyl carbonate (DEC) are mixed at a weight ratio of 20:10:70, $LiPF_6$ was dissolved to 1.4 M, and then 1 g of propene sultone (PRS) and 1 g of lithium fluoromalonato (difluoro) borate (LiFMDFB) were added thereto as an additive to prepare a non-aqueous electrolyte solution of the present invention (see Table 1 below).

(Manufacturing of Positive Electrode)

In an N-methylpyrrolidone solvent, a positive electrode active material ($LiNi_{0.5}Co_{0.3}Mn_{0.2}O_2$), a conductive material (carbon black), and a binder (PVdF) was mixed at a weight ratio of 97:1.7:1.3 to prepare a positive electrode slurry (solid content 70 wt %). The positive electrode slurry was applied to a positive electrode current collector (Al thin film) having a thickness of 10 μm, dried, and then roll-pressed to manufacture a positive electrode (see Table 1 below).

(Manufacturing of Negative Electrode)

A negative electrode active material (graphite):conductive material (carbon black):binder (PVdF) were added to distilled water at a weight ratio of 96:0.5:3.5 to prepare a negative electrode slurry (solid content 50 wt %). The negative electrode slurry was applied to a copper (Cu) thin film, which is a negative electrode current collector, having a thickness of 8 μm, dried and then roll pressed to manufacture a negative electrode.

(Manufacturing of Secondary Battery)

The positive electrode and the negative electrode manufactured as described above were sequentially stacked with a porous polyethylene film to manufacture an electrode assembly according to a typical method. Thereafter, the electrode assembly was received in a pouch-type secondary battery case, and the above-prepared non-aqueous electrolyte solution was injected thereto.

Thereafter, by performing a formation process of charging up to SOC 17% at a 0.2 C rate while pressing to 0.5 kgf/cm² per area, and then charging up to SOC 65% at a 0.7 C rate while pressing to 5.0 kgf/cm² per area at 60° C., a pouch-type secondary battery was manufactured.

Example 2

A pouch-type secondary battery was manufactured in the same manner as in Example 1 except that a non-aqueous organic solvent in which ethylene carbonate (EC):fluoroethylene carbonate (FEC):diethyl carbonate (DEC) are mixed at a weight ratio of 15:15:70 was used as the non-aqueous organic solvent when preparing the non-aqueous electrolyte solution (see Table 1 below).

Example 3

A pouch-type secondary battery was manufactured in the same manner as in Example 1 except that a non-aqueous organic solvent in which ethylene carbonate (EC):fluoroethylene carbonate (FEC):ethyl propionate (EP):propyl propionate (PP) are mixed at a weight ratio of 20:10:25:45 was used as the non-aqueous organic solvent when preparing the non-aqueous electrolyte solution (see Table 1 below).

Example 4

A pouch-type secondary battery was manufactured in the same manner as in Example 1 except that 1 g of propene sultone (PRS), 1 g of lithium fluoromalonato (difluoro) borate (LiFMDFB), 3 g of propane sultone (PS), and 5 g of succinonitrile (SN) were added as the additive when preparing the non-aqueous electrolyte solution (see Table 1 below).

Comparative Example 1

A pouch-type secondary battery was manufactured in the same manner as in Example 4 except that propene sultone (PRS) and lithium fluoromalonato (difluoro) borate (LiFMDFB) were not added when preparing the non-aqueous electrolyte solution (see Table 1 below).

Comparative Example 2

A pouch-type secondary battery was manufactured in the same manner as in Example 1 except that propene sultone (PRS) was not added when preparing the non-aqueous electrolyte solution (see Table 1 below).

Comparative Example 3

A pouch-type secondary battery was manufactured in the same manner as in Example 1 except that lithium fluoromalonato (difluoro) borate (LiFMDFB) was not added when preparing the non-aqueous electrolyte solution (see Table 1 below).

Comparative Example 4

A pouch-type secondary battery was manufactured in the same manner as in Example 1 except that a non-aqueous organic solvent in which ethylene carbonate (EC):fluoroethylene carbonate (FEC):diethyl carbonate (DEC) are mixed at a weight ratio of 30:5:65 was used as the non-aqueous organic solvent when preparing the non-aqueous electrolyte solution (see Table 1 below).

Comparative Example 5

A pouch-type secondary battery was manufactured in the same manner as in Example 1 except that a non-aqueous organic solvent in which ethylene carbonate (EC):fluoroethylene carbonate (FEC):diethyl carbonate (DEC) are mixed at a weight ratio of 30:10:60 was used as the non-aqueous organic solvent when preparing the non-aqueous electrolyte solution (see Table 1 below).

Comparative Example 6

A pouch-type secondary battery was manufactured in the same manner as in Example 1 except that a non-aqueous organic solvent in which ethylene carbonate (EC):fluoroethylene carbonate (FEC):diethyl carbonate (DEC) are mixed at a weight ratio of 20:5:75 was used as the non-aqueous organic solvent when preparing the non-aqueous electrolyte solution (see Table 1 below)

TABLE 1

|  | Organic solvent | | Additive | | | |
| --- | --- | --- | --- | --- | --- | --- |
|  | Type/weight ratio | Addition amount (g) | PRS (g) | LiFMDFB (g) | SN (g) | PS (g) |
| Example 1 | EC:FEC:DEC = 20:10:70 | 98 | 1 | 1 | — | — |
| Example 2 | EC:FEC:DEC- 15:15:70 | 98 | 1 | 1 | — | — |
| Example 3 | EC:FEC:EP:PP = 20:10:25:45 | 98 | 1 | 1 | — | — |
| Example 4 | EC:FEC:DEC = 20:10:70 | 90 | 1 | 1 | 5 | 3 |
| Comparative Example 1 | EC:FEC:DEC = 20:10:70 | 92 | — | — | 5 | 3 |
| Comparative Example 2 | EC:FEC:DEC = 20:10:70 | 99 | — | 1 | — | — |
| Comparative Example 3 | EC:FEC:DEC = 20:10:70 | 99 | 1 | — | — | — |
| Comparative Example 4 | EC:FEC:DEC = 30:5:65 | 98 | 1 | 1 | — | — |
| Comparative Example 5 | EC:FEC:DEC = 30:10:60 | 98 | 1 | 1 | — | — |
| Comparative Example 6 | EC:FEC:DEC = 20:5:75 | 98 | 1 | 1 | — | — |

EXPERIMENTAL EXAMPLES

Experimental Example 1.
High-Temperature/High-Voltage Cycle Properties

The secondary battery manufactured in each of Examples 1 to 4 and Comparative Examples 1 to 6 was charged to 4.35 V (0.05 C cut off) at 45° C. under the conditions of CC/CV and 0.7 C. Thereafter, the battery was discharged to 3.0 V under the conditions of CC and 0.5 C. The above charge/discharge behavior was set as one cycle, and the cycle was repeated 200 times to measure the discharge capacity at the 200th cycle and to measure the capacity retention rate (%) with respect to an initially designed capacity. The measurement results are shown in [Table 2] below. (Initially designed capacity 4300 mAh)

TABLE 2

|  | Discharge capacity at $200^{th}$ cycle (mAh) | Capacity retention rate (%) |
| --- | --- | --- |
| Example 1 | 3685.1 | 85.7 |
| Example 2 | 3715.2 | 86.4 |
| Example 3 | 3637.8 | 84.6 |
| Example 4 | 3900.5 | 90.7 |
| Comparative Example 1 | 3623.2 | 84.2 |
| Comparative Example 2 | 3102.4 | 72.1 |
| Comparative Example 3 | 3163.1 | 73.5 |
| Comparative Example 4 | 3478.7 | 80.9 |
| Comparative Example 5 | 3603.4 | 83.8 |
| Comparative Example 6 | 3547.5 | 82.5 |

Experimental Example 2. Transition Metal Elution Amount Evaluation

The secondary battery manufactured in each of Examples 1 to 4 and Comparative Examples 1 to 6 was charged to 4.35 V (0.05 C cut off) at 45° C. under the conditions of CC/CV and 0.7 C. Thereafter, the battery was discharged to 3.0 V under the conditions of CC and 0.5 C. The above charge/discharge behavior was set as one cycle, and the cycle was repeated 200 times. Thereafter, the elution amount of transition metals was measured.

The transition metal elution amount was measured in the following manner. The battery discharged 200 times was decomposed to sample one negative electrode, and then the negative electrode was washed thoroughly in DMC. Thereafter, the negative electrode active material was scraped off therefrom to be subjected to an ICP analysis to determine the elution amount of Ni, Co, and Mn, which are transition metals of the positive electrode. ICP-OES (PERKIN-ELMER, OPTIMA 5300DV) was used as an ICP analysis device.

The measurement results are shown in [Table 3] below.

TABLE 3

|  | Ni elution amount (mg/kg) | Co elution amount (mg/kg) | Mn elution amount (mg/kg) |
| --- | --- | --- | --- |
| Example 1 | 65 | 65 | 180 |
| Example 2 | 60 | 50 | 180 |
| Example 3 | 65 | 65 | 195 |
| Example 4 | 50 | 40 | 150 |
| Comparative Example 1 | 65 | 70 | 200 |
| Comparative Example 2 | 95 | 85 | 230 |

TABLE 3-continued

|  | Ni elution amount (mg/kg) | Co elution amount (mg/kg) | Mn elution amount (mg/kg) |
|---|---|---|---|
| Comparative Example 3 | 105 | 90 | 250 |
| Comparative Example 4 | 75 | 75 | 215 |
| Comparative Example 5 | 75 | 70 | 215 |
| Comparative Example 6 | 65 | 60 | 205 |

Experimental Example 3. High-Temperature Storage Properties Evaluation

The battery manufactured in each of Examples 1 to 4 and Comparative Examples 1 to 6 was charged to 4.35 V, and then stored for about three weeks at 60° C. Thereafter, the residual capacity retention rate with respect to the initial capacity and the swelling properties were evaluated. The evaluation results are shown in Table 4 below.

TABLE 4

|  | Capacity retention rate (%) | Swelling (%) |
|---|---|---|
| Example 1 | 80 | 25 |
| Example 2 | 81 | 23 |
| Example 3 | 74 | 29 |
| Example 4 | 83 | 20 |
| Comparative Example 1 | 72 | 32 |
| Comparative Example 2 | 64 | 48 |
| Comparative Example 3 | 66 | 43 |
| Comparative Example 4 | 70 | 41 |
| Comparative Example 5 | 72 | 52 |
| Comparative Example 6 | 71 | 34 |

Through the above [Table 2] to [Table 4], it can be confirmed that in the case of the lithium secondary batteries of Examples 1 to 4 in which a non-aqueous electrolyte satisfying the composition of an organic solvent and the composition of an additive according to the present invention was used, the capacity retention rate at high temperatures/high voltages was high and the transition metal elution amount was small, and furthermore, the swelling properties at the time of high temperature storage were excellent.

On the other hand, in the case of Comparative Examples 1 to 6 in which the composition of an additive or the composition of an organic solvent did not satisfy the conditions of the present invention, the capacity retention rate at high temperatures/high voltages, the transition metal elution amount, and the swelling properties during high temperature storage were inferior to those of Examples 1 to 4.

The invention claimed is:

1. A lithium secondary battery comprising:
a positive electrode including a lithium-nickel-cobalt-manganese-based oxide as a positive electrode active material;
a negative electrode including a carbon-based negative electrode active material;
a separator disposed between the negative electrode and the positive electrode; and
a non-aqueous electrolyte solution comprising a lithium salt, an organic solvent, and an additive,
wherein the organic solvent includes fluoroethylene carbonate in an amount of 10 wt % or greater and ethylene carbonate in amount of 20 wt % or less, based on the total weight of the organic solvent,
wherein the additive includes propene sultone and lithium fluoromalonato (difluoro) borate, and
wherein a driving voltage of the lithium secondary battery is 4.35 V or higher.

2. The lithium secondary battery of claim 1, wherein the fluoroethylene carbonate is included in an amount of 10 wt % to 40 wt % based on the total weight of the organic solvent.

3. The lithium secondary battery of claim 1, wherein the fluoroethylene carbonate is included in an amount of 10 wt % to 30 wt % based on the total weight of the organic solvent.

4. The lithium secondary battery of claim 1, wherein the ethylene carbonate is included in an amount of 10 wt % to 20 wt % based on the total weight of the organic solvent.

5. The lithium secondary battery of claim 1, wherein the propene sultone is included in an amount of 0.5 wt % to 5 wt % based on the total weight of the non-aqueous electrolyte solution.

6. The lithium secondary battery of claim 1, wherein the lithium fluoromalonato (difluoro) borate is included in an amount of 0.1 wt % to 3 wt % based on the total weight of the non-aqueous electrolyte solution.

7. The lithium secondary battery of claim 1, wherein the organic solvent further comprises a linear carbonate solvent, a propionate-based solvent, or a combination thereof.

8. The lithium secondary battery of claim 1, wherein the organic solvent comprises 10 to 20 wt % of ethylene carbonate, 10 to 40 wt % of fluoroethylene carbonate, and 40 to 80 wt % of linear carbonate.

9. The lithium secondary battery of claim 1, wherein the organic solvent comprises ethylene carbonate, fluoroethylene carbonate, and a propionate-based solvent.

10. The lithium secondary battery of claim 9, wherein the propionate-based solvent comprises ethyl propionate and propyl propionate.

11. The lithium secondary battery of claim 10, wherein a weight ratio of the propyl propionate to the ethyl propionate is 1 or greater.

12. The lithium secondary battery of claim 1, wherein the organic solvent comprises 10 to 30 wt % of fluoroethylene carbonate, 10 to 20 wt % of ethylene carbonate, 10 to 30 wt % of ethyl propionate, and 30 to 70 wt % of propyl propionate.

13. The lithium secondary battery of claim 1, wherein the lithium-nickel-cobalt-manganese-based oxide is represented by [Formula 1] below:

$$Li_x[Ni_yCo_zMn_wM^1_v]O_{2-p}A_p \qquad \text{[Formula 1]}$$

wherein, in Formula 1 above,
$M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
A is one or more elements selected from the group consisting of F, Cl, Br, I, At, and S, and
$1.0 \leq x \leq 1.30$, $0.3 \leq y < 1$, $0 < z \leq 0.6$, $0 < w \leq 0.6$, $0 \leq v \leq 0.2$, and $0 \leq p \leq 0.2$.

* * * * *